United States Patent
He (10) Patent No.: US 11,269,796 B2
(45) Date of Patent: Mar. 8, 2022

(54) ACCELERATION CONTROL SYSTEM BASED ON BINARIZATION ALGORITHM, CHIP, AND ROBOT

(71) Applicant: AMICRO SEMICONDUCTOR CO., LTD., Guangdong (CN)

(72) Inventor: Zaisheng He, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 0 days.

(21) Appl. No.: 17/267,504

(22) PCT Filed: Dec. 7, 2018

(86) PCT No.: PCT/CN2018/119916
§ 371 (c)(1),
(2) Date: Feb. 10, 2021

(87) PCT Pub. No.: WO2020/034500
PCT Pub. Date: Feb. 20, 2020

(65) Prior Publication Data
US 2021/0311894 A1 Oct. 7, 2021

(30) Foreign Application Priority Data
Aug. 14, 2018 (CN) .......................... 201810920821.5

(51) Int. Cl.
*G06F 13/28* (2006.01)
*G06F 5/06* (2006.01)
(Continued)

(52) U.S. Cl.
CPC .............. *G06F 13/28* (2013.01); *G06F 5/065* (2013.01); *G06F 13/4031* (2013.01); *G06T 1/60* (2013.01); *G06T 2200/28* (2013.01)

(58) Field of Classification Search
CPC ...... G06F 13/28; G06F 13/4031; G06F 5/065; G06T 1/60; G06T 2200/28
See application file for complete search history.

(56) References Cited

U.S. PATENT DOCUMENTS 7,053,895 B2 * 5/2006 Yamagata ................. G06T 1/20
345/419
7,443,526 B2 * 10/2008 Takano .............. H04N 1/00917
358/1.15
(Continued)

FOREIGN PATENT DOCUMENTS

| CN | 101359225 A | 2/2009 |
|---|---|---|
| CN | 101567078 A | 10/2009 |
| CN | 108161938 A | 6/2018 |

*Primary Examiner* — Brian T Misiura
(74) *Attorney, Agent, or Firm* — Gang Yu (57) ABSTRACT

Disclosed are an acceleration control system based on a binarization algorithm, a chip, and a robot, which is configured to read and write an external image memory by means of an AHB bus. The acceleration control system includes a main control module, a binarization module, and a binarization FIFO module, and the main control module is configured to control the AHB bus to read pixel data to be processed in the image memory and control current pixel data in the AHB bus to be burst-transmitted to the binarization module for processing when a main state machine is in a burst read mode state, and meanwhile control the binarization FIFO module to read binarized data obtained and when all of the pixel data stored in the image memory is processed, and it is notified to send an interrupt instruction to a CPU.

18 Claims, 2 Drawing Sheets

(51) Int. Cl.
 *G06F 13/40* (2006.01)
 *G06T 1/60* (2006.01)

(56) References Cited

U.S. PATENT DOCUMENTS

| | | | |
|---|---|---|---|
| 7,701,594 B2* | 4/2010 | Shiraishi | G06F 3/12 358/1.13 |
| 2017/0046101 A1 | 2/2017 | Kersh et al. | |
| 2021/0174467 A1* | 6/2021 | Hao | G06T 1/0007 |

* cited by examiner

ACCELERATION CONTROL SYSTEM BASED ON BINARIZATION ALGORITHM, CHIP, AND ROBOT

CROSS-REFERENCE TO RELATED APPLICATIONS

The present disclosure takes the Chinese Patent Application No. 201810920821.5, filed on Aug. 14, 2018, and entitled "acceleration control system based on binarization algorithm, chip, and robot", as the priority, the entire contents of which are incorporated herein by reference.

TECHNICAL FIELD

The present disclosure relates to the field of hardware accelerators, in particular to an acceleration control system based on a binarization algorithm, a chip, and a robot.

BACKGROUND

At present, when using VSLAM for map building and location, a sweeper needs to preprocess obtained image data before the image data is used by software. Among them, there is a processing algorithm called binarization operation. The binarization operation is an image processing mode, which turns an image into a grayscale graph to enhance the edge effect and is widely applied to image processing. The software needs to read, process and write back the image data when performing binarization operation processing. On an on-chip system of the prior art, a CPU gives an access command which passes through the AHB bus, finds a space where the memory resides, and accesses the memory. Under the condition of access success, the memory sends a signal of a successful response to the AHB bus, along with data that other CPUs want to receive, and the AHB bus transmits the signals back to the CPU for an instruction operation. Since the units of CPU logic are standard sequential or combinatorial components, which can be flipped very quickly, and a memory unit of the memory is often implemented by a pile of combinatorial logic, such that access to the memory units has to wait several clock periods for a response, which greatly reduces the efficiency of the CPU. Therefore, in the process of repeatedly reading, writing and binarizing the image pixels, in a case that binarized data processing and transmission are completed by means of CPU intervention, software resources are greatly consumed, the working time of CPUs of other modules is preempted, the working speed of the other modules is influenced, particularly, the workload of the CPUs is greatly increased when a large number of images are processed, and the performance of the whole chip is seriously influenced.

SUMMARY

The objective of the present disclosure is to provide an acceleration control system based on a binarization algorithm, the acceleration control system being used for reading and writing an external image memory by means of an AHB bus, and the acceleration control system further includes a main control module, a binarization module and a binarization FIFO module, the binarization module is configured to receive and binarize pixel data, transmitted in a burst mode, in the image memory, transmit binarized data obtained by processing to the binarization FIFO module, and notify the acceleration control system to send an interrupt instruction to a CPU when all the pixel data of an image stored in the image memory is processed; the main control module comprises a main state machine, a burst read state machine, a burst write state machine and an interface control state machine, and the main control module is configured to control, by means of the interface control state machine, the AHB bus to read pixel data to be processed in the image memory and control current pixel data in the AHB bus to be transmitted to the binarization module in a burst mode for processing when the main state machine is in a burst read mode state, and meanwhile control, by means of the burst read state machine, the binarization FIFO module to read the binarized data obtained by processing previous pixel data, transmitted in the burst mode, in the binarization module, such that the acceleration control system increases a processing speed of binarization by means of a pipeline running mode under control by the main control machine; and the main control module is further configured to write, by means of the burst write state machine, the binarized data stored in the binarization FIFO module into the AHB bus when the main state machine is in a burst write mode state, and meanwhile write, by means of the interface control state machine, the binarized data in the AHB bus back into the image memory.

Optionally, the main state machine is configured to activate, in the burst read mode state, the burst read state machine to enter a burst read working state from an initial state, read pixel data of one burst transmission length in the image memory in a burst mode by means of the AHB bus, control the pixel data in the AHB bus to be transmitted to the binarization module in a burst mode, meanwhile control, by means of the burst read state machine, the binarization FIFO module to read, in a burst mode, the binarized data obtained by processing in the binarization module, control, by means of the interface control state machine, next pixel data of one burst transmission length read, in a burst mode, in the AHB bus to be transmitted, in a burst mode, to the binarization module for processing when the binarized data of one burst transmission length is not completely stored in the binarization FIFO module, and enter a burst read mode waiting state when the binarized data of one burst transmission length is completely stored in the binarization FIFO module; the main state machine is configured to wait for the AHB bus to prepare for writing, in a burst mode, the binarization FIFO module in the burst read mode waiting state, and after the burst read mode waiting state lasts for a clock period, the burst read mode waiting state is skipped to the burst write mode state;

the main state machine is configured to activate, in the burst write mode state, the burst write state machine to enter a burst write working state from an initial state, so as to control the binarized data of one burst transmission length to be written out, in a burst mode, to the AHB bus from the binarization FIFO module, meanwhile control, by means of the interface control state machine, the binarized data of one burst transmission length in the AHB bus to be written back into the image memory, and control, by means of the burst write state machine, next binarized data of one burst transmission length in the binarization FIFO module to be transmitted, in a burst mode, to the AHB bus when the binarized data of one burst transmission length is not completely written into the image memory, and enter a burst write mode waiting state from the burst write mode state when the binarized data of one burst transmission length is completely written into the image memory; and the main state machine is configured to determine whether all the pixel data of the image memory is binarized in the burst write mode waiting state and according to the number of the binarized data in the binarization FIFO module, if yes, the main state machine enters an ending state from the burst write mode waiting state, and if not, the main state machine enters the burst read mode state; a depth of the binarization FIFO module equals the burst transmission length, the burst transmission length is the number of data transmitted in a burst mode each time, and the burst transmission length in the burst read mode state is equal to the burst transmission length in the burst write mode state.

Optionally, the burst read state machine is configured to completely read, in a burst mode, the pixel data of one burst transmission length in the image memory to the binarization module in the burst read working state, meanwhile control the binarization module to binarize the pixel data transmitted in a burst mode, and transmit the binarized data obtained by corresponding processing to the binarization FIFO module, and enter a burst read completion state when last data in the binarized data of one burst transmission length starts to be transmitted into the binarization FIFO module; the burst read state machine is configured to enter, in the burst read completion state, a burst read waiting state when the last data in the binarized data of one burst transmission length is transmitted into the binarization FIFO module, so as to wait for an interface preparation signal to be set as high and skip back to an initial state; the burst write state machine is configured to control, in the burst write working state, the binarization FIFO module to complete writing, in a burst mode, the binarized data of one burst transmission length back to the AHB bus, meanwhile, control the binarized data to be transmitted and written into the image memory from the AHB bus, and enter a burst write completion state when the last data in the binarized data of one burst transmission length starts to be transmitted and written into the image memory; and the burst write state machine is configured to enter a burst write waiting state in the burst write completion state when the last data in the binarized data of one burst transmission length is already written, in a burst mode, back to the image memory, so as to wait for the interface preparation signal to be set as high and skip back to the initial state.

Optionally, the interface control state machine is configured to wait for transmission in an initial state, and in a case that the burst read state machine enters the burst read working state or the burst write state machine enters the burst write working state, and when the image memory indicates that burst read/write is ready by means of the interface preparation signal, the interface control state machine enters a discontinuous transmission state; the interface control state machine is configured to enter a continuous transmission state in a case that the burst read state machine does not completely read, in a burst mode, binarized data of one burst transmission length to the binarization FIFO module in the burst read working state, or in a case that the burst write state machine does not indirectly control, in the burst write working state, the AHB bus to completely write, in a burst mode, the binarized data of one burst transmission length into the image memory in the discontinuous transmission state; the interface control state machine is configured to enter the initial state in a case that the burst read state machine completely reads, in a burst mode, the binarized data of one burst transmission length to the binarization FIFO module in the burst read working state, or in a case that the burst write state machine indirectly controls, in the burst write working state, the AHB bus to completely write, in a burst mode, the binarized data of one burst transmission length into the image memory in the discontinuous transmission state; and the interface control state machine is configured to enter the initial state in a case that last data in the binarized data of one burst transmission length is already read into the binarization FIFO module in a burst mode, or in a case that last data in the binarized data of one burst transmission length is already written into the image memory in a burst mode in the continuous transmission state.

Optionally, the acceleration control system is configured with a read-write register bank for a AHB bus burst transmission, wherein a read register is configured to store pixel data transmitted, in a burst mode, by the image memory, corresponding burst transmission length information, and burst read instruction information, sent by the interface control state machine, of an AHB protocol, and a write register is configured to store binarized data transmitted, in a burst mode, by the binarization module, corresponding burst transmission length information and burst write instruction information, sent by the interface control state machine, of the AHB protocol; and the read-write register bank is configured to carry out read-write operation according to the burst instruction information, based on the AHB protocol, sent by the interface control state machine: when a burst read operation is carried out, selects the read register to read in or read out the pixel data according to the burst read instruction information analyzed by the AHB bus; and when a burst write operation is carried out, selects the write register to write in or write out the binarized data according to the burst write instruction information analyzed by the AHB bus.

Optionally, the acceleration control system is further configured with an interrupt register which is used for notifying a CPU to extract the binarized data from a corresponding address unit in the image memory after all the pixel data of the image stored in the image memory is binarized, and then software processing is carried out.

A chip is an image processing chip, an internal architecture thereof includes the acceleration control system, and the system is configured to accelerate the process of binarizing the pixel data.

A robot is a mobile vision robot internally provided with the image processing chip.

The embodiment of the present disclosure has the beneficial effects that reading, processing and writing-out of the image data are completely completed by a hardware circuit, data reading, data operation and data write-back of the image data mentioned above are completed in a hardware mode, the operation does not need software to participate in the whole process at all, and only the CPU needs to perform information configuration at the beginning of operation, and process interrupt when the operation is finished. Therefore, the binarization algorithm is achieved in a hardware mode, the CPU can be liberated, and the software efficiency is greatly improved.

Further specific and preferred aspects of the present disclosure are presented in the appended independent and dependent claims. Features of the dependent claims may be suitably combined with features of the independent claims in combination modes other than those explicitly set forth in the claims.

DETAILED DESCRIPTION OF THE EMBODIMENTS

All modules and state machines involved in the embodiment of the present disclosure are logic circuits, and in practical application, one logic circuit may be a physical unit or a part of a physical unit, and may also be achieved by a combination of a plurality of physical units. Furthermore, in order to highlight the innovative part of the present disclosure, units which are less closely related to solving the technical problem of the present disclosure are not introduced in the embodiments of the present disclosure, but this does not indicate that no other units are present in the embodiments of the present disclosure.

The embodiment of the present disclosure provides an acceleration control system based on a binarization algorithm. The acceleration control system is used for reading and writing an external image memory by means of an AHB bus and carrying out binarization calculation processing on pixel data in the image memory, and is applied to an integrated circuit as a hardware acceleration processing system, and compared with software processing, the acceleration control system may increase an image processing speed, save a CPU bandwidth, and reduce the consumption of software resources. The acceleration control system further includes a main control module, a binarization module, a binarization FIFO module and an AHB bus for the above modules to be mounted. It should be noted that in the acceleration control system, an interface timing based on the AHB bus needs to conform to an AMBAHB protocol.

Before the acceleration control system reads, writes and binarizes the pixel data, a CPU needs to configure an address and pixel resolution of an image stored in the image memory in advance, a pixel size range is as follows: a minimum value is 1*1, a maximum value is 1024*1024, which is stored in a storage medium in a matrix form, and in the embodiment of the present disclosure, the image memory is an SRAM on an SOC or a DDR outside the SOC. In addition, the CPU configures a binarizing mode and a binarization result in a target storage address of the image memory. A burst transmission length specified by the acceleration control system is the number of data transmitted in a burst mode each time and is set to be 16 in the embodiment of the present disclosure, but the burst transmission length is not excluded from being set to be 8, 4, 2 or 1 according to the pixel data actually to be processed in the image memory, in addition, the burst transmission length is equal in a burst read mode state and a burst write mode state, and correspondingly, a depth of the binarization FIFO module is 16.

Figure 1:
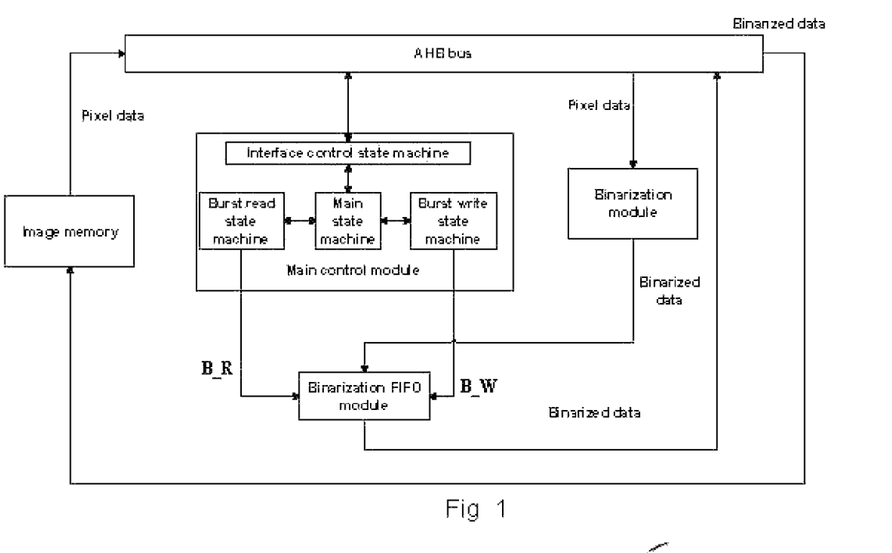
FIG. 1 is a schematic diagram of an acceleration control system framework based on a binarization algorithm, provided by the embodiment of the present disclosure.

As an embodiment of the present disclosure, as shown in FIG. 1, the binarization module includes a binarization logic circuit and a register, under the control of the main control module, the binarization module reads the pixel data in the image memory by means of the AHB bus in a burst mode and transmits the pixel data to the binarization logic circuit, the pixel data transmitted, in a burst mode, in the image memory is binarized in the binarization logic circuit, that is, the pixel data is compared with a preset threshold value in the image memory to obtain corresponding binarized data, then the binarized data is transmitted to the binarization FIFO module by means of the register, and the acceleration control system is notified to send an interrupt instruction to the CPU when all the pixel data of the image stored in the image memory is processed.

In the main control module provided by the embodiment of the present disclosure, four state machines including a main state machine, a burst read state machine, a burst write state machine and an interface control state machine are designed. Under the control of the main state machine, the main control module reads and binarizes the pixel data in the image memory, and writes the binarized data back into the image memory. Specifically, the CPU sends an interrupt enable instruction, a start flag bit start is set to be 1, and the main state machine starts to skip from an initial state IDLE to a burst read mode state BRD_ST; when the main state machine is in the burst read mode state BRD_ST, the main control module controls, by means of an AHB analysis instruction of the interface control state machine, the AHB bus to read the pixel data to be processed in the image memory, and controls current pixel data in the AHB bus to be transmitted to the binarization module in a burst mode for processing; and meanwhile, the burst read state machine sends a read control signal B_R to the binarization FIFO module, so as to control the binarization FIFO module to read the binarized data obtained by processing the previous pixel data, in the binarization module, transmitted in a burst mode, making the acceleration control system read and process the pixel data of the plurality of burst transmission lengths simultaneously, thereby forming a pipeline operation structure to accelerate a binarization processing process. The main state machine skips to the burst write mode state BWR_ST after a waiting state of one clock cycle. In the burst write mode state BWR_ST, the burst write state machine sends a write control signal B_W to the binarization FIFO module, so as to control the binarized data stored in the binarization FIFO module to be written into the AHB bus, and meanwhile, the binarized data in the AHB bus is controlled to be written back into the image memory by means of the interface control state machine, thereby accelerating a read-write process of the binarized data.

Specifically, in the main control module, the state machine access included in the main control module uses a three-level structure access mode, that is, an access request, an access response and an access end. With a first-in first-out principle for the state machine access, once the state machine is occupied, the other access will be shielded. The main state machine controls the other three state machines, such that the access request is sent by the main state machine, when one state machine detects the access request and is in an access initial state, the access response is given, and in a case that the main state machine detects an access response handshake signal, the state machine mentioned above activates the state thereof, enters a corresponding state, and gives an access ending command to the main state machine according to a clock period of the burst transmission occupied by the state of the state machine. After the main state machine detects the access end, the access of this time is ended, a next state is entered, and the next state machine is accessed, for example, the operation of activating the burst read state machine in the burst read mode state is switched to the operation of activating the burst write state machine in the burst write mode state.

Figure 2:
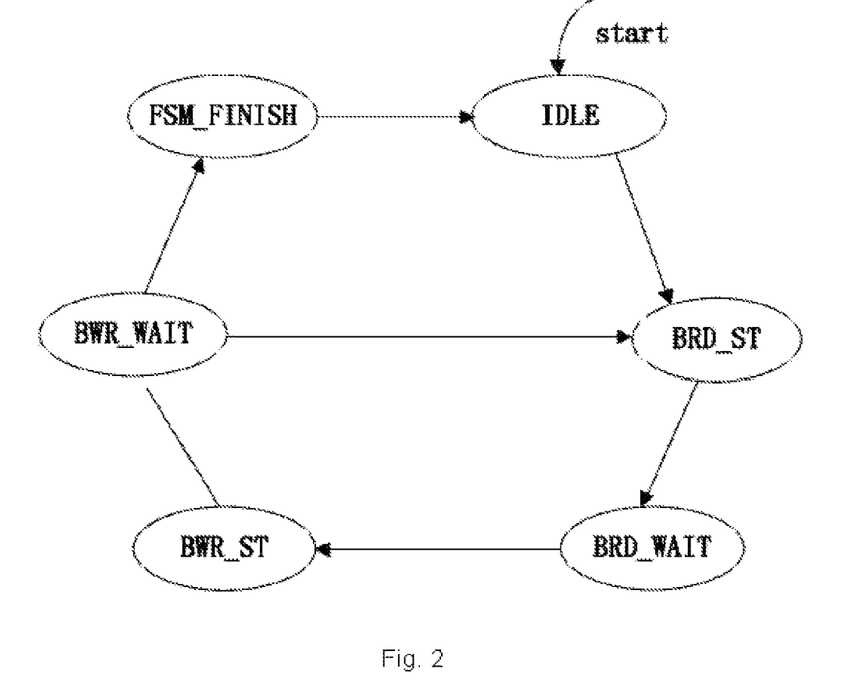
FIG. 2 is a schematic state transition diagram of a main state machine in the main control module provided by the embodiment of the present disclosure.

As an embodiment of the present disclosure, in conjunction with FIGS. 1 and 2, the start flag bit start is set to be 1, then the main state machine skips from the initial state IDLE to the burst read mode state BRD_ST; and in the burst read mode state BRD_ST, the main state machine activates the burst read state machine, making the burst read state machine enter a burst read working state BST_RD from an initial state IDLE1. The main state machine reads the pixel data of one burst transmission length in the image memory in a burst mode to the binarization module by means of the AHB bus, wherein the burst transmission length represents that 16 data are transmitted in a burst mode at a time; and meanwhile, the main state machine controls the burst read state machine to send out a control read signal B_R, so as to make the binarization FIFO module read, in a burst mode, and store the binarized data, of one burst transmission length, obtained by processing of the binarization module, wherein the binarized data of the burst transmission length is binarized data obtained by processing the previous pixel data, in the binarization module, transmitted in a burst mode. The main state machine controls, by means of the interface control state machine, the next pixel data of one burst transmission length read, in a burst mode, from the image memory in the AHB bus to be transmitted, in a burst mode, to the binarization module for processing when the binarized data of one burst transmission length are not completely stored in the binarization FIFO module, and the main state machine enters a burst read mode waiting state BRD_WAIT from the burst read mode state BRD_ST when the binarized data of one burst transmission length are completely stored in the binarization FIFO module. Specifically, the depth of the binarization FIFO module equals the burst transmission length.

In the burst read mode waiting state BRD_WAIT, the main state machine waits for the AHB bus to prepare for writing, in a burst mode, the binarization FIFO module; the main state machine does not control the AHB bus to perform transmission in the state and lasts for a clock period until an interface preparation signal is set as high, which indicates that the AHB bus is ready for burst write, then the burst read mode waiting state BRD_WAIT skips to a burst write mode state BWR_ST, in the burst write mode state BWR_ST, the main state machine starts the burst write state machine, the burst write state machine enters a burst write working state BST_WR from an initial state IDLE2, so as to control the binarized data of one burst transmission length to be written out to the AHB bus from the binarization FIFO module in a burst mode, and meanwhile, the previous binarized data, of one burst transmission length, stored in the AHB bus are controlled to be written back to the image memory by means of the interface control state machine, wherein the burst transmission length represents that 16 data are transmitted in a burst mode at a time. The main state machine controls the burst write state machine to send out a control write signal B_W when the binarized data of one burst transmission length is not completely written into the image memory, so as to transmit, in a burst mode, the next binarized data burst of one burst transmission length in the binarization FIFO module to the AHB bus, and the main state machine does not enter a burst write mode waiting state BWR_WAIT from the burst write mode state BWR_ST until the binarized data of one burst transmission length are completely written into the image memory.

In the burst write mode waiting state BWR_WAIT, the main state machine determines whether the number of the binarized data in the binarization FIFO module equals the number of all the pixel data in the image memory according to the number of the binarized data obtained on the basis of the processing of the pixel data in the binarization FIFO module, and if so, all the pixel data of the image memory is processed, and an end state FSM_FINISH is entered from the burst write mode waiting state BWR_WAIT.

Figure 3:
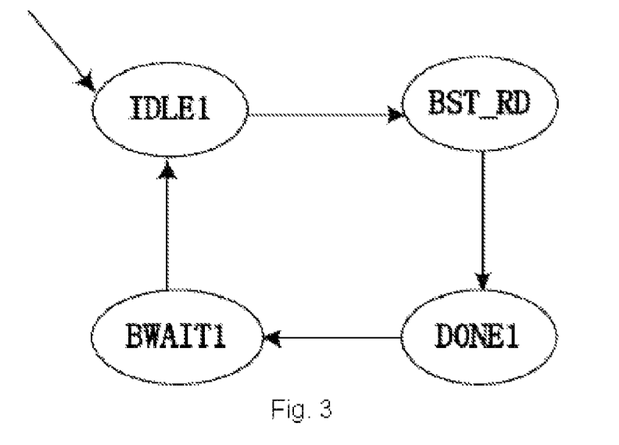
FIG. 3 is a schematic state transition diagram of a burst read state machine in the main control module provided by the embodiment of the present disclosure.

In some embodiments of the present disclosure, the main state machine is in a burst read mode state BRD_ST, and when the interface preparation signal is set as high, as shown in FIG. 3, the burst read state machine skips to a burst read working state BST_RD from an initial state IDLE1. In the burst read working state BST_RD, the burst read state machine controls the interface control state machine to send a burst read instruction based on an AHB protocol to the AHB bus, so as to completely transmit, in a burst mode, the pixel data of one burst transmission length in the image memory to the binarization module, meanwhile, the pixel data, of one burst transmission length, transmitted in the binarization module are compared with the preset threshold value to obtain the corresponding binarized data of one burst transmission length, and the binarized data of one burst transmission length are transmitted to the binarization FIFO module, and the burst read state machine does not enter a burst read completion state DONE1 until the last data in the binarized data of one burst transmission length starts to be transmitted into the binarization FIFO module. In the burst read completion state DONE1, when the last data in the binarized data of one burst transmission length is transmitted into the binarization FIFO module, the burst read state machine enters a burst read waiting state BWAIT1 so as to wait for the interface preparation signal to be set as high and skip back to the initial state IDLE1.

Figure 4:
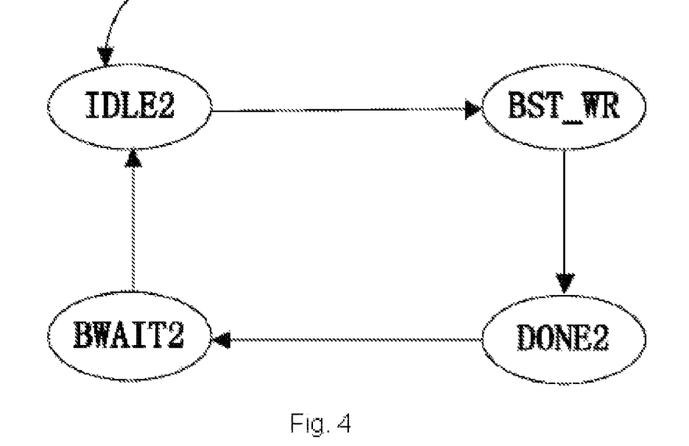
FIG. 4 is a schematic state transition diagram of a burst write state machine in the main control module provided by the embodiment of the present disclosure.

In some embodiments of the present disclosure, the main state machine is in a burst write mode state BWR_ST, and when the interface preparation signal is set as high, as shown in FIG. 4, the burst write state machine skips to a burst write working state BST_WR from an initial state IDLE2. In the burst write working state BST_WR, the burst write state machine sends a control signal to the binarization FIFO module, such that the binarization FIFO module completely writes, in a burst mode, the binarized data of one burst transmission length back to the AHB bus, meanwhile, the burst read state machine controls the interface control state machine to send the burst write instruction based on the AHB protocol to the AHB bus, so as to write, in a burst mode, the binarized data into the image memory from the AHB bus, and the burst write state machine does not enter a burst write completion state DONE2 until the last data in the binarized data of one burst transmission length starts to be transmitted and written into the image memory. In the burst write completion state DONE2, when the last data in the binarized data of one burst transmission length is written into the image memory, the burst write state machine enters a burst write waiting state BWAIT2 so as to wait for the interface preparation signal to be set as high and skip back to the initial state IDLE2.

Figure 5:
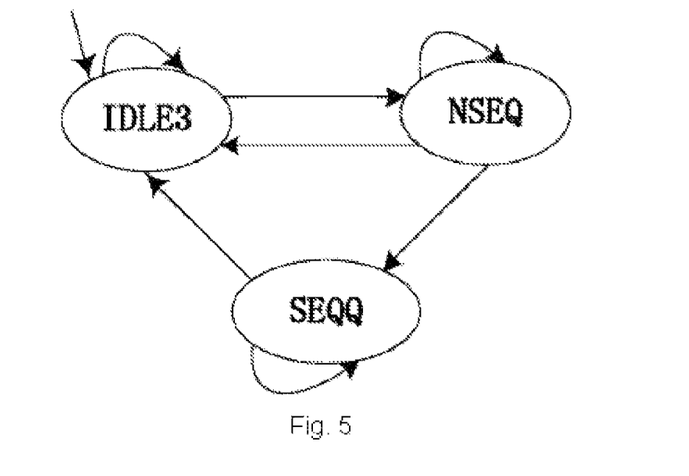
FIG. 5 is a schematic state transition diagram of an interface control state machine in the main control module provided by the embodiment of the present disclosure.

In some embodiments of the present disclosure, as shown in FIG. 5, skip conditions of the state of the interface control state machine are determined according to the working states of the burst read state machine and the burst write state machine. In the initial state IDLE3, the interface control state machine waits for burst transmission of the pixel data. In a case that the burst read state machine enters the burst read working state BST_RD or the burst write state machine enters the burst write working state BST_WR, and when the image memory indicates that burst read/write is ready by means of the interface preparation signal, the interface control state machine enters a discontinuous transmission state NSEQ from the initial state IDLE3.

In the discontinuous transmission state NSEQ, the interface preparation signal is set as high, in a case that the burst read state machine does not completely read, in a burst mode, the binarized data of one burst transmission length to the binarization FIFO module in the burst read working state BST_RD, or in a case that the burst write state machine indirectly controls, by means of the main state machine, the AHB bus to not completely write the binarized data of one burst transmission length into the image memory in a burst mode in the burst write working state BST_WR, the interface control state machine enters a continuous transmission state SEQQ from the discontinuous transmission state NSEQ; burst transmission between the pixel data and the binarized data is performed under the control of the burst read state machine and the burst write state machine; and in a case that the burst read state machine completely reads the binarized data of one burst transmission length to the binarization FIFO module in a burst mode in the burst read working state BST_RD, or in a case that the burst write state machine indirectly controls, by means of the main state machine, the AHB bus to completely write the binarized data of one burst transmission length into the image memory in a burst mode in the burst write working state BST_WR, the interface control state machine enters the initial state IDLE3 from the discontinuous transmission state NSEQ, which represents single transmission operation. However, in the discontinuous transmission state NSEQ, in a case that the interface preparation signal is set not to be high, the interface control state machine stays in the discontinuous transmission state NSEQ.

In the continuous transmission state SEQQ, when the interface preparation signal is set as high, in a case that under the control of the burst read state machine, the last data in the binarized data of one burst transmission length is already read into the binarization FIFO module in a burst mode, or in a case that the burst write state machine sends the burst write instruction based on the AHB protocol to the interface control state machine by means of the main state machine so as to control the AHB bus to completely write the last data in the binarized data of one burst transmission length into the image memory in a burst mode, the interface control state machine enters the initial state IDLE3 from the continuous transmission state SEQQ; and in a case that the interface preparation signal is set not to be high, or in a case that the interface preparation signal is set as high but the above binarized data of one burst transmission length does not complete the burst read-write operation in the continuous transmission state SEQQ, the interface control state machine stays in the continuous transmission state SEQQ.

In some embodiments of the present disclosure, the acceleration control system is configured with a read-write register bank for AHB bus burst transmission, wherein a read register is configured to store the pixel data transmitted, in a burst mode, by the image memory, corresponding burst transmission length information and burst read instruction information, based on an AHB protocol, sent by the interface control state machine, and a write register is configured to store the binarized data transmitted, in a burst mode, by the binarization module, corresponding burst transmission length information and burst write instruction information, sent by the interface control state machine, of the AHB protocol; and the read-write register bank carries out read-write operation according to the burst instruction information, based on the AHB protocol, sent by the interface control state machine: when the burst read operation is carried out, selecting the read register to read in or read out the pixel data according to the burst read instruction information analyzed by the AHB bus; and when the burst write operation is carried out, selecting the write register to write in or write out the binarized data according to burst write instruction information analyzed by the AHB bus. In the embodiment of the present disclosure, the one-time burst transmission length is 16 data, and when the number of the pixel data in the image memory is less than 16 but greater than 8, the read-write register bank configures the burst transmission length to be 8 for burst read; when the number of the pixel data in the image memory is less than 8 but greater than 4, the read-write register bank configures the burst transmission length to be 4 for burst read; when the number of the pixel data in the image memory is less than 4 but greater than 2, the read-write register bank configures the burst transmission lengths to be 2 for burst read; and when the number of the pixel data in the image memory is less than 2, the read-write register bank configures the burst transmission length to be 1 for single-time read. Therefore, in the acceleration control system, both the burst read state machine and the burst write state machine support burst16, burst8, burst4 and burst2 transmission.

In some embodiments of the present disclosure, the acceleration control system is further provided with an interrupt register, when the image memory starts to transmit the pixel data to the AHB bus in a burst mode, the interrupt register receives an interrupt signal sent by the CPU, and the main control module enables interrupt; and after all pixel data of the image stored in the image memory is binarized, the CPU is notified, by means of the interrupt register, to extract the binarized data from a corresponding address unit in the image memory, and software processing is carried out under the control of the CPU. Compared with direct control over read write operation by a CPU, a lot of responses and requests are reduced, and the hardware acceleration circuit is higher in efficiency of processing the process.

The embodiment of the present disclosure designs and uses four state machines to control binarization of the input pixel data and the binarized data obtained by processing, and the main state machine is configured to control conversion processes of the burst read state machine, the burst write state machine and the interface control state machine, data interaction between the interface control state machine and the image memory is completed by means of the AHB bus to transmit the control instruction, the whole state conversion process requires the CPU to configure a data access address in advance and receive an interrupt notification of an operation result, and data interaction is completed without other intervention of the CPU.

A chip is an image processing chip, and the internal architecture thereof includes the acceleration control system which serves as an image binarization algorithm acceleration engine and is used for accelerating the process of binarizing the image pixel data and improving data throughput of an image processing system and an operation speed of the binarization algorithm.

A robot is a mobile vision robot internally provided with the image processing chip which used for accelerating the processing process of image data collected by a camera of the mobile vision robot.

The device embodiments described as above are merely schematic, wherein the units illustrated as separate components may or be physically separate or not, and the components shown as units may be physical units or not, that is, may be located in one place, or may also be distributed over a plurality of network units. Part or all of the modules may be selected according to actual needs to achieve the purpose of the solution of the embodiment. Those of ordinary skill in the art may understand and implement the present disclosure without paying creative work.

What is claimed is:

1. An acceleration control system based on a binarization algorithm, the acceleration control system being used for reading and writing an external image memory by means of an AHB bus, wherein the acceleration control system further comprises a main control module, a binarization module and a binarization FIFO module,
the binarization module is configured to receive and binarize pixel data, transmitted in a burst mode, in the image memory, transmit binarized data obtained by processing to the binarization FIFO module, and notify the acceleration control system to send an interrupt instruction to a CPU when all the pixel data of an image stored in the image memory is processed;
the main control module comprises a main state machine, a burst read state machine, a burst write state machine and an interface control state machine, and the main control module is configured to control, by means of the interface control state machine, the AHB bus to read pixel data to be processed in the image memory and control current pixel data in the AHB bus to be transmitted to the binarization module in a burst mode for processing when the main state machine is in a burst read mode state, and meanwhile control, by means of the burst read state machine, the binarization FIFO module to read the binarized data obtained by processing previous pixel data, transmitted in the burst mode, in the binarization module, such that the acceleration control system increases a processing speed of binarization by means of a pipeline running mode under control by the main control machine; and
the main control module is further configured to write, by means of the burst write state machine, the binarized data stored in the binarization FIFO module into the AHB bus when the main state machine is in a burst write mode state, and meanwhile write, by means of the interface control state machine, the binarized data in the AHB bus back into the image memory.

2. The acceleration control system according to claim 1, wherein the main state machine is configured to activate, in the burst read mode state, the burst read state machine to enter a burst read working state from an initial state, read pixel data of one burst transmission length in the image memory in a burst mode by means of the AHB bus, control the pixel data in the AHB bus to be transmitted to the binarization module in a burst mode, meanwhile control, by means of the burst read state machine, the binarization FIFO module to read, in a burst mode, the binarized data obtained by processing in the binarization module, control, by means of the interface control state machine, next pixel data of one burst transmission length read, in a burst mode, in the AHB bus to be transmitted, in a burst mode, to the binarization module for processing when the binarized data of one burst transmission length is not completely stored in the binarization FIFO module, and enter a burst read mode waiting state when the binarized data of one burst transmission length is completely stored in the binarization FIFO module;
the main state machine is configured to wait for the AHB bus to prepare for writing, in a burst mode, the binarization FIFO module in the burst read mode waiting state, and after the burst read mode waiting state lasts for a clock period, the burst read mode waiting state is skipped to the burst write mode state;
the main state machine is configured to activate, in the burst write mode state, the burst write state machine to enter a burst write working state from an initial state, so as to control the binarized data of one burst transmission length to be written out, in a burst mode, to the AHB bus from the binarization FIFO module, meanwhile control, by means of the interface control state machine, the binarized data of one burst transmission length in the AHB bus to be written back into the image memory, and control, by means of the burst write state machine, next binarized data of one burst transmission length in the binarization FIFO module to be transmitted, in a burst mode, to the AHB bus when the binarized data of one burst transmission length is not completely written into the image memory, and enter a burst write mode waiting state from the burst write mode state when the binarized data of one burst transmission length is completely written into the image memory; and
the main state machine is configured to determine whether all the pixel data of the image memory is binarized in the burst write mode waiting state and according to the number of the binarized data in the binarization FIFO module, if yes, the main state machine enters an ending state from the burst write mode waiting state, and if not, the main state machine enters the burst read mode state;
wherein a depth of the binarization FIFO module equals the burst transmission length, the burst transmission length is the number of data transmitted in a burst mode each time, and the burst transmission length in the burst read mode state is equal to the burst transmission length in the burst write mode state.

3. The acceleration control system according to claim 2, wherein the burst read state machine is configured to completely read, in a burst mode, the pixel data of one burst transmission length in the image memory to the binarization module in the burst read working state, meanwhile control the binarization module to binarize the pixel data transmitted in a burst mode, and transmit the binarized data obtained by corresponding processing to the binarization FIFO module, and enter a burst read completion state when last data in the binarized data of one burst transmission length starts to be transmitted into the binarization FIFO module;
the burst read state machine is configured to enter, in the burst read completion state, a burst read waiting state when the last data in the binarized data of one burst transmission length is transmitted into the binarization FIFO module, so as to wait for an interface preparation signal to be set as high and skip back to an initial state;
the burst write state machine is configured to control, in the burst write working state, the binarization FIFO module to complete writing, in a burst mode, the binarized data of one burst transmission length back to the AHB bus, meanwhile, control the binarized data to be transmitted and written into the image memory from the AHB bus, and enter a burst write completion state when the last data in the binarized data of one burst transmission length starts to be transmitted and written into the image memory; and
the burst write state machine is configured to enter a burst write waiting state in the burst write completion state when the last data in the binarized data of one burst transmission length is already written, in a burst mode, back to the image memory, so as to wait for the interface preparation signal to be set as high and skip back to the initial state.

4. The acceleration control system according to claim 1, wherein the interface control state machine is configured to wait for transmission in an initial state, and in a case that the burst read state machine enters the burst read working state or the burst write state machine enters the burst write working state, and when the image memory indicates that burst read/write is ready by means of the interface preparation signal, the interface control state machine enters a discontinuous transmission state;

the interface control state machine is configured to enter a continuous transmission state in a case that the burst read state machine does not completely read, in a burst mode, binarized data of one burst transmission length to the binarization FIFO module in the burst read working state, or in a case that the burst write state machine does not indirectly control, in the burst write working state, the AHB bus to completely write, in a burst mode, the binarized data of one burst transmission length into the image memory in the discontinuous transmission state;

the interface control state machine is configured to enter the initial state in a case that the burst read state machine completely reads, in a burst mode, the binarized data of one burst transmission length to the binarization FIFO module in the burst read working state, or in a case that the burst write state machine indirectly controls, in the burst write working state, the AHB bus to completely write, in a burst mode, the binarized data of one burst transmission length into the image memory in the discontinuous transmission state; and the interface control state machine is configured to enter the initial state in a case that last data in the binarized data of one burst transmission length is already read into the binarization FIFO module in a burst mode, or in a case that last data in the binarized data of one burst transmission length is already written into the image memory in a burst mode in the continuous transmission state.

5. The acceleration control system according to claim 1, wherein the acceleration control system is configured with a read-write register bank for a AHB bus burst transmission, wherein a read register is configured to store pixel data transmitted, in a burst mode, by the image memory, corresponding burst transmission length information, and burst read instruction information, sent by the interface control state machine, of an AHB protocol, and a write register is configured to store binarized data transmitted, in a burst mode, by the binarization module, corresponding burst transmission length information and burst write instruction information, sent by the interface control state machine, of the AHB protocol; and the read-write register bank is configured to carry out read-write operation according to the burst instruction information, based on the AHB protocol, sent by the interface control state machine: when a burst read operation is carried out, selects the read register to read in or read out the pixel data according to the burst read instruction information analyzed by the AHB bus; and when a burst write operation is carried out, selects the write register to write in or write out the binarized data according to the burst write instruction information analyzed by the AHB bus.

6. The acceleration control system according to claim 1, wherein the acceleration control system is further configured with an interrupt register which is used for notifying a CPU to extract the binarized data from a corresponding address unit in the image memory after all the pixel data of the image stored in the image memory is binarized, and then software processing is carried out.

7. A chip, wherein the chip is an image processing chip, an internal architecture of the chip comprises the acceleration control system according to claim 1, and the system is configured to accelerate the process of binarizing the pixel data.

8. A robot, wherein the robot is a mobile vision robot internally provided with the image processing chip according to claim 7.

9. A chip, wherein the chip is an image processing chip, an internal architecture of the chip comprises the acceleration control system according to claim 2, and the system is configured to accelerate the process of binarizing the pixel data.

10. A chip, wherein the chip is an image processing chip, an internal architecture of the chip comprises the acceleration control system according to claim 3, and the system is configured to accelerate the process of binarizing the pixel data.

11. A chip, wherein the chip is an image processing chip, an internal architecture of the chip comprises the acceleration control system according to claim 4, and the system is configured to accelerate the process of binarizing the pixel data.

12. A chip, wherein the chip is an image processing chip, an internal architecture of the chip comprises the acceleration control system according to claim 5, and the system is configured to accelerate the process of binarizing the pixel data.

13. A chip, wherein the chip is an image processing chip, an internal architecture of the chip comprises the acceleration control system according to claim 6, and the system is configured to accelerate the process of binarizing the pixel data.

14. A robot, wherein the robot is a mobile vision robot internally provided with the image processing chip according to claim 9.

15. A robot, wherein the robot is a mobile vision robot internally provided with the image processing chip according to claim 10.

16. A robot, wherein the robot is a mobile vision robot internally provided with the image processing chip according to claim 11.

17. A robot, wherein the robot is a mobile vision robot internally provided with the image processing chip according to claim 12.

18. A robot, wherein the robot is a mobile vision robot internally provided with the image processing chip according to claim 13.

* * * * *